(12) United States Patent
Vaez-Ghaemi et al.

(10) Patent No.: US 12,289,137 B2
(45) Date of Patent: Apr. 29, 2025

(54) TEST DEVICE WITH DISTRIBUTED UNIT EMULATION FOR TESTING IN OPEN RADIO ACCESS NETWORK

(71) Applicant: VIAVI SOLUTIONS INC., Chandler, AZ (US)

(72) Inventors: Reza Vaez-Ghaemi, Potomac, MD (US); David Fenstermacher, Mount Airy, MD (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 455 days.

(21) Appl. No.: 17/881,966

(22) Filed: Aug. 5, 2022

(65) Prior Publication Data

US 2023/0046743 A1    Feb. 16, 2023

Related U.S. Application Data

(60) Provisional application No. 63/232,408, filed on Aug. 12, 2021.

(51) Int. Cl.
| | |
|---|---|
| H04B 10/07 | (2013.01) |
| H04B 10/2575 | (2013.01) |
| H04B 17/00 | (2015.01) |
| H04B 17/10 | (2015.01) |
| H04B 17/16 | (2015.01) |
| H04W 24/00 | (2009.01) |
| H04W 24/08 | (2009.01) |

(52) U.S. Cl.
CPC ....... *H04B 17/16* (2015.01); *H04B 10/25759* (2013.01); *H04B 17/0085* (2013.01); *H04B 17/102* (2015.01); *H04W 24/08* (2013.01)

(58) Field of Classification Search
None
See application file for complete search history.

(56) References Cited

U.S. PATENT DOCUMENTS

| | | | | |
|---|---|---|---|---|
| 2021/0314211 | A1* | 10/2021 | Grayson | H04L 41/0213 |
| 2022/0417097 | A1* | 12/2022 | Nakata | H04L 63/0428 |
| 2023/0017470 | A1* | 1/2023 | Niiranen | G01R 31/2844 |
| 2023/0021816 | A1* | 1/2023 | Kaszuk | H04W 88/085 |
| 2024/0154857 | A1* | 5/2024 | Ogihara | H04W 24/04 |
| 2024/0306017 | A1* | 9/2024 | Hishi | H04W 24/04 |

* cited by examiner

*Primary Examiner* — Duc T Duong
(74) *Attorney, Agent, or Firm* — Mannava & Kang, P.C.

(57) ABSTRACT

A test device tests conditions associated with a fronthaul in an Open Radio Access Network (O-RAN). The test device can field test an O-RAN radio unit (O-RU) installed at a cell site by emulating an O-RAN distributed unit (O-DU) in the O-RAN connected to the O-RU via the fronthaul of the O-RAN. The testing includes testing connectivity of the O-RU to the fronthaul. The testing includes executing managing plane (M-plane) and synchronization plane (S-plane) messaging to test management session establishment, device setting testing, and master clock synchronization testing. Additionally, optical insertion loss in the fronthaul and frequency and power of signals transmitted from the O-RU can be tested.

20 Claims, 5 Drawing Sheets

TEST DEVICE WITH DISTRIBUTED UNIT EMULATION FOR TESTING IN OPEN RADIO ACCESS NETWORK

BACKGROUND

A cell site, also known as a cell tower or cellular base station, includes an antenna and electronic communications equipment to support cellular mobile device communication. The antenna and equipment are typically placed in connection with a radio mast or tower, and the equipment generally connects cell site air interfaces to wireline networks, which may be comprised of fiber optic cables and coaxial cables. Cellular mobile devices communicating with a single cell tower generally constitute a local subnetwork, while the connection between the cell tower and the rest of the world may be referred to as a backhaul link or simply backhaul. A backhaul may include wired, fiber optic and wireless components, such as microwave transmission equipment. In conventional 3G and 4G architectures, fronthaul is associated with a Radio Access Network (RAN) architecture including centralized Base Band Units (BBUs), i.e., baseband controllers, and standalone Remote Radio Heads (RRHs) installed at remote cell sites. These BBU and RRH functional blocks, as well as the equipment that performs these functions, are located further away from each other than in prior mobile backhaul models. In some instances, the RRH and BBU are at the same location. In other instances, the RRH is located at the cell site, whereas the BBU is located in a centralized and protected location where it serves multiple RRHs. The optical links that interconnect the BBU and the multiple RRHs are referred to as fronthaul. The fronthaul includes interfaces between the RRH and the BBU. The backhaul includes interfaces between the BBU and the Evolved Packet Core (EPC). The BBU performs signal processing functions including converting layer 1 communications to layer 3 and vice versa for transmitting data to and from the EPC. A key challenge of the traditional RAN architecture which may be used for 3G or 4G services has to do with limitations regarding scaling and flexibility of deployment, optimization, management and orchestration of the network. Delivering 5G services often requires high-bandwidth, low latency, and signal processing flexibility that may not be possible with the traditional RAN architecture. Also, in the traditional RAN architecture, proprietary hardware and design with no multi-vendor interoperability are often used for fronthaul associated hardware and software. As a result, it is often difficult to install and test RRHs in the traditional RAN architecture.

To overcome the deficiencies of the traditional RAN, operators are moving to a dis-aggregated approach for signal processing hardware and software and to open, interoperable interfaces that are multi-vendor interoperable. To achieve the above-mentioned goals of an open radio access network, operators founded the Open RAN (O-RAN) Alliance (www.o-ran.org) to clearly define requirements and help build a supply chain eco-system that can foster an environment for existing and new vendors to drive innovation. As per the charter of the O-RAN Alliance, O-RAN Alliance members and contributors have committed to evolving radio access networks around the world. In an O-RAN architecture, RANs will be built on a foundation of virtualized network elements, white-box hardware and standardized interfaces that fully embrace O-RAN's core principles of intelligence and openness.

An O-RAN architecture includes cell towers, O-RAN radio units (O-RUs) which may be located at the cell towers, and decentralized processing units including an O-RAN distributed unit (O-DU) and an O-RAN central unit (O-CU), and a RAN Intelligent Controller (RIC). The O-RUs host a low physical (low-PHY) layer and radio frequency (RF) processing equipment based on a lower layer functional split. This is similar to 3G RRH but further including the low-PHY layer. The O-DU handles a high-PHY layer and media access control (MAC) and radio link control (RLC) layers with network function virtualization (NFV) or containers. The RIC is a logical function that enables near-real-time control and optimization of O-RAN elements and resources via fine-grained data collection and actions. The RIC may also include a logical function that enables non-real-time control and optimization of RAN elements and resources, artificial intelligence/machine learning workflow including model training and updates, and policy-based guidance of applications and features.

Field technicians and contractors responsible for 5G O-RAN installations currently do not have the capability to automatically test O-RAN radio unit (O-RU) installations. Often, they have to rely on personal expertise to try to properly test and verify the installation of O-RUs and antennas. This can result in long durations for installation and testing of O-RUs due to the complexity of relying on expertise of technicians, poor test coverage of existing instruments and use of multiple instruments to perform tests for O-RU installation.

BRIEF DESCRIPTION OF THE DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to de at least one of a particular element. As used herein, the term "includes" means includes but not limited to, the term "including" means including but not limited to. The term "based on" means based at least in part on.

To overcome the deficiencies of the traditional RAN, operators are moving to the O-RAN architecture which provides a dis-aggregated approach for signal processing hardware and software and open, interoperable interfaces that are multi-vendor interoperable. However, field technicians tasked with O-RAN installations, including installations of O-RUs at cell sites, currently have to carry multiple test instruments and follow manual procedures to try to correctly test and verify the installation of the O-RUs and antennas, such as before connecting the O-RUs to O-DUs via an O-RAN fronthaul. This can result in failed installations and extended durations to close out installations due to the complexity of the testing poor test coverage of existing equipment, and the required use of multiple test instruments.

According to an example of the present disclosure, a test device is operable to test conditions associated with a fronthaul in an O-RAN. The test device can emulate an O-DU to test O-RU installation. To emulate an O-DU, the test device operates in compliance with the O-RAN fronthaul specifications as published by the O-RAN Alliance at https://www.o-ran.org/specifications. The O-RAN specifications include the Open Fronthaul Interfaces Workgroup specifications, the split option 7.2× O-RAN specification, and other O-RAN specifications relevant to the fronthaul which are discussed below. The specifications specify protocol stacks, requirements for messaging over the fronthaul between an O-RU and an O-DU and other requirements discussed below. To emulate an O-DU, the test device operates as an O-DU as required by the O-RAN fronthaul specifications to communicate with the O-RU and perform operations with the O-RU via the fronthaul as is described below.

The test device includes an optical interface, e.g., a small form-factor pluggable (SFP) port, connectable to a fiber optic cable in the fronthaul. The fiber optical cable may be used to connect an O-RU installed at a cell site to an O-DU. The test device can connect to the fiber optical cable in the fronthaul, and emulate the O-DU to perform multiple tests on the O-RU before connecting the O-RU to an actual O-DU during installation. Examples of the tests that may be performed by the test device may include testing physical layer connectivity, such as whether the O-RU is powered up and connected to the fronthaul and transmitting a signal, and link layer connectivity, including testing for a proper MAC address and a proper virtual local area network (VLAN) being used by the O-RU and whether the O-RU can be assigned a dynamic Internet Protocol (IP) address. Also, the test device can perform O-RAN fronthaul O-DU emulation testing to test Control/User/Synchronization/Management-plane (C/U/S/M-plane) functionalities at 10 Gbps, 25 Gbps and other speeds.

Furthermore, the test device also can generate graphical user interfaces (GUIs) on a display of the test device that can guide the technician through the results of the tests, and display remedial actions that can be performed by the technician to address any failed tests. The test device can be embodied in a single, battery powered portable instrument that can be carried to cell sites, and may include interfaces, such as WIFI or other interfaces, to connect to remote devices and computers as needed. The test device provides an easy-to-use workflow that covers many aspects of O-RU installation verification. By providing a single test tool that provides workflow-based O-RU test methodology, technicians can complete O-RU installation and testing in less time and with less complexity and minimize the need to send technicians to cell sites after installation to diagnose and fix problems that could have been fixed during installation.

Figure 1:
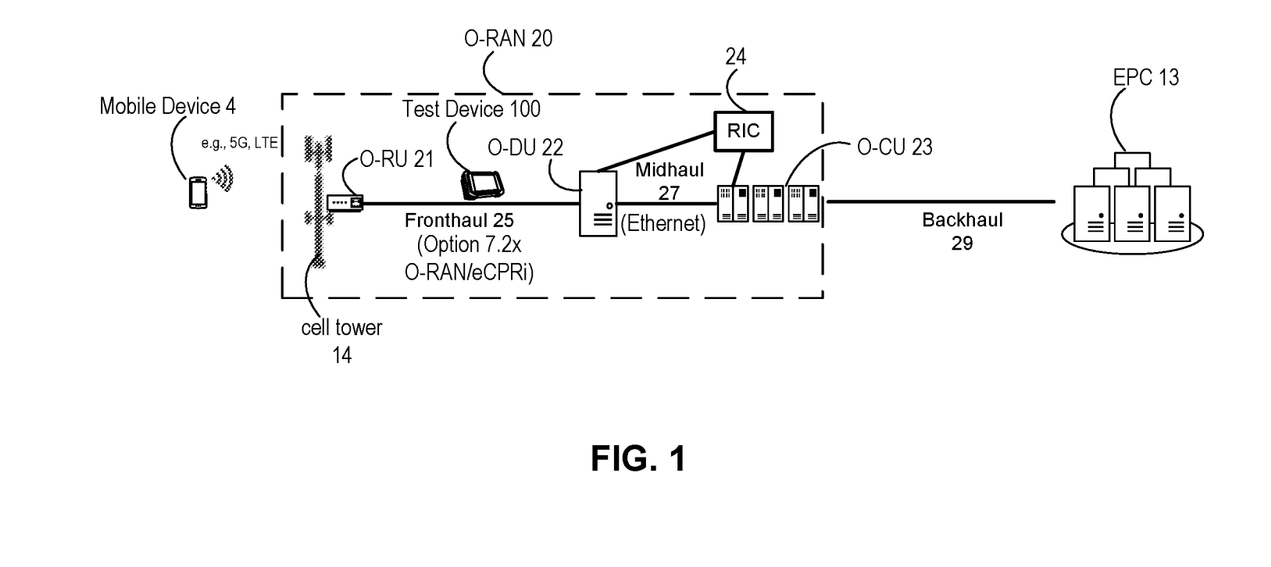
FIG. 1 illustrates an O-RAN architecture, including a test device, according to an example of the present disclosure.

FIG. 1 shows O-RAN 20 including cell tower 14, O-RU 21, and decentralized processing performed by O-DU 22, O-CU 23 and RIC 24. The O-RU 21, O-DU 22, O-CU 23 and RIC 24 are logical nodes, and their functions are performed by underlying physical equipment. The O-RAN 20 is comprised of a network of radio base stations and radios situated between mobile terminals and a core network, and that complies with the O-RAN specifications published by the O-RAN alliance at www.o-ran.org.

The O-RU 21 is at the edge of O-RAN 20 and performs edge processing between the mobile device 4 and the O-DU 22. The O-DU 22, O-CU 23 and RIC 24 are in the middle and perform signal processing for communication between the EPC 13 and O-RU 21. The O-RU 21 hosts the low-PHY layer and RF processing based on a lower layer functional split. This is similar to a 3G RRH but more specific in including the low-PHY layer. The O-DU 22 hosts the high-PHY layer, and the MAC and RLC layer with network function virtualization or containers. The RIC 24 is a logical function that enables near-real-time control and optimization of O-RAN elements and resources via fine-grained data collection and actions. The RIC 24 may also include a logical function that enables non-real-time control and optimization of RAN elements and resources, artificial intelligence/machine learning workflow including model training and updates, and policy-based guidance of applications and features. The processor intensive functionality is performed by the O-CU 23 which includes hosting the Radio Resource Control Protocol, the Service Data Adaptation Protocol and the Packet Data Convergence Protocol, and associated control planes.

The processing performed by O-CU 23 and RIC 24 may be performed by servers and other telecommunications equipment as is known in the art. Radios and other communications processing equipment may perform the processing of O-RU 21, and base station equipment, including signal processing equipment, may perform the processing of the O-DU 22. The O-RU 21 may be located at the cellular tower 14 and is connected to the antennas of the cellular tower 14. The O-DU 22 may be located at some distance away from the O-RU 21, by way of example, less than 1 mile to 10 miles. Although not shown, the O-DU 22 may be connected to multiple O-RUs.

The fronthaul 25 is a circuit between a baseband processing section of base station equipment and radio equipment. The fronthaul 25 includes fiber-based interfaces and dedicated fibers between the O-RU 21 and the O-DU 22. The midhaul 27 includes interfaces and communication lines between the O-DU 22, the O-CU 23 and RIC 24. The backhaul 29 includes interfaces and communication lines between the O-CU 23 and EPC 13.

Many 5G applications require low-latency (e.g., streaming video), making the fronthaul bandwidth issue an important factor. Depending on the deployment configurations, 5G can deliver 10× to 100× data rates more than LTE. 5G base stations are capable of delivering 10+ GigaBytes per Second (Gpbs) data rates whereas an LTE base station is capable of delivering <1 Gbps. The open protocol for the O-RAN fronthaul can deliver both these data rates.

The O-RAN specification regarding the fronthaul details all of the signaling formats and control messages needed for multivendor O-DU and O-RU equipment to interoperate. It supports both enhanced Common Public Radio Interface (eCPRI) and Radio over Ethernet (RoE) transport mechanisms and it defines fronthaul for both 4G and 5G. The Third Generation Partnership Project (3GPP) has defined a key section of the transport network called the Functional Split defining at which PHY level the connection between two elements across the fronthaul is connected. This allows splitting the network into different segments, allowing only segments closest to the O-RU to carry all the time-critical traffic, while segments closer to the O-CU are no longer required to carry this traffic.

The O-RAN specification has specified an eCPRI-based 7.2x open interface split between the O-RU and O-DU, and this standardized fronthaul interface enables multi-vendor interoperability, while optimizing fronthaul transmission rates and maximizing RF performance. The Split option 7.2x is an O-RAN specification that defines a split of functions between an O-RU and O-DU that can be implemented in the fronthaul 25 of the O-RAN 20. As discussed above, the O-RU 21 hosts the low-PHY layer and RF processing based on a lower layer functional split. The O-DU 22 hosts the high-PHY layer, and the MAC and RLC layer with network function virtualization or containers.

The split option 7.2x also defines control, user and synchronization plane (C/U/S) specifications that describe signal formats and equipment operations. Furthermore, the split option 7.2x implementable on the fronthaul 25 uses eCPRI for the C/U-Planes. eCPRI defines a packet-based message format that can be used to exchange information between the O-RU 21 and the O-DU 22. eCPRI messages can be transmitted in Ethernet frames. In the C/U-Planes defined by the split option 7.2x, eCPRI can be used for signal transmissions over the fronthaul 25. In particular the O-RAN specification defines the protocol stack for the C/U-Planes as Ethernet Layer 1, Ethernet Layer 2 and VLAN, and eCPRI, where IP and UDP are optional. In the S-Plane, signals are transmitted over the fronthaul 25 using precision time protocol (PTP) and SynchE (system for transmitting clock signals over Ethernet). In particular, the O-RAN specification defines the protocol stack for the S plane as Ethernet Layer 1, Ethernet Layer 2 and PTP/SynchE. The management plane (M-Plane) is another plane specified in the O-RAN specifications and the M-Plane is used to manage the radio unit and provide O-RU management functions to set parameters on the O-RU side as required by the C/U-Planes and S-Plane. The O-RAN specification defines the protocol stack for the M-plane as Ethernet Layer 1, Ethernet Layer 2, Internet Protocol (IP), Transmission Control Protocol (TCP), Secure Shell (SSH) and Network Configuration Protocol (NETCONF) which are further discussed below.

Figure 2:
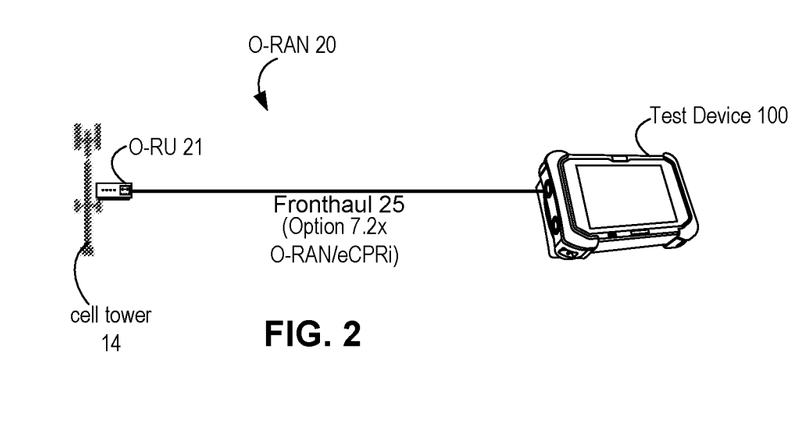
FIG. 2 illustrates the test device connected to a device under test in, according to an example of the present disclosure.

FIG. 1 also shows test device 100 that is connectable to the fronthaul 25 and can emulate the O-DU 22 to test the O-RU 21. In particular, FIG. 2 shows the test device 100 connected to the fronthaul 25 of O-RAN 20 and is operable to emulate the O-DU 22 to test the O-RU 21, which is the device under test in this example. For example, the test device 100 can connect to a fiber of the fronthaul 25 that is connected to the O-RU 21 to test various functionalities and operations of the O-RU 21 as described herein. The test device 100 may be used for testing during installation of the O-RU 21, or may be used at other times, such as after installation, for example, to troubleshoot the O-RU 21 if it is malfunctioning. The test device 100 can test multiple radio types including but not limited to 3GPP Long-Term Evolution (LTE) and 5G.

The test device 100 can store workflows for testing, and the workflows can be defined centrally or at the test device 100 and loaded to the test device 100. A workflow walks the technician through a predetermined test procedure, such as through instructions provided via one or more GUIs presented on a display of the test device 100. The workflow eliminates the variability of manual procedures and thereby drives consistent, repeatable results, regardless of technician skill or experience level. Training for technicians shifts to the test process itself, which is faster and easier to learn, rather than on technical information that is generally time-consuming and overwhelming for new technicians.

The test device 100 can emulate an O-DU connected to the fronthaul to test installation and operation of the O-RU 21. To emulate the O-DU to test the O-RU 21, the test device 100 uses signaling formats and control messaging that are specified in the O-RAN specification which is published by the O-RAN alliance at www.o-ran.org as mentioned above. The O-RAN fronthaul specification defines planes of operations that specify messaging for different operations. These planes are mentioned above with respect to the split option 7.2x and include control plane (C-Plane), user plane (U-Plane), synchronization plane (S-Plane) and management plane (M-Plane). The M-Plane specifies management plane messages used to manage the radio unit and provide O-RU management functions to set parameters on the O-RU side as required by the C/U-Plane and S-Plane. The C-Plane specifies control plane messages and commands for scheduling, beam-forming, down link precoding configuration, etc. The U-Plane specifies user plane messages for efficient data transfer within the strict time limits of 5G applications, and includes information for data compression, quadrature (I/Q) data transfer and downlink precoding. The S-Plane specifies messages for timing and synchronization aspects between the O-DU and the O-RU, including synchronizing the O-RU with a grandmaster clock available to the O-DU. To emulate the O-DU to test the O-RU 21, the test device 100 uses messaging, signaling formats and protocols specified for the O-DU for each of the planes discussed above.

Figure 3:
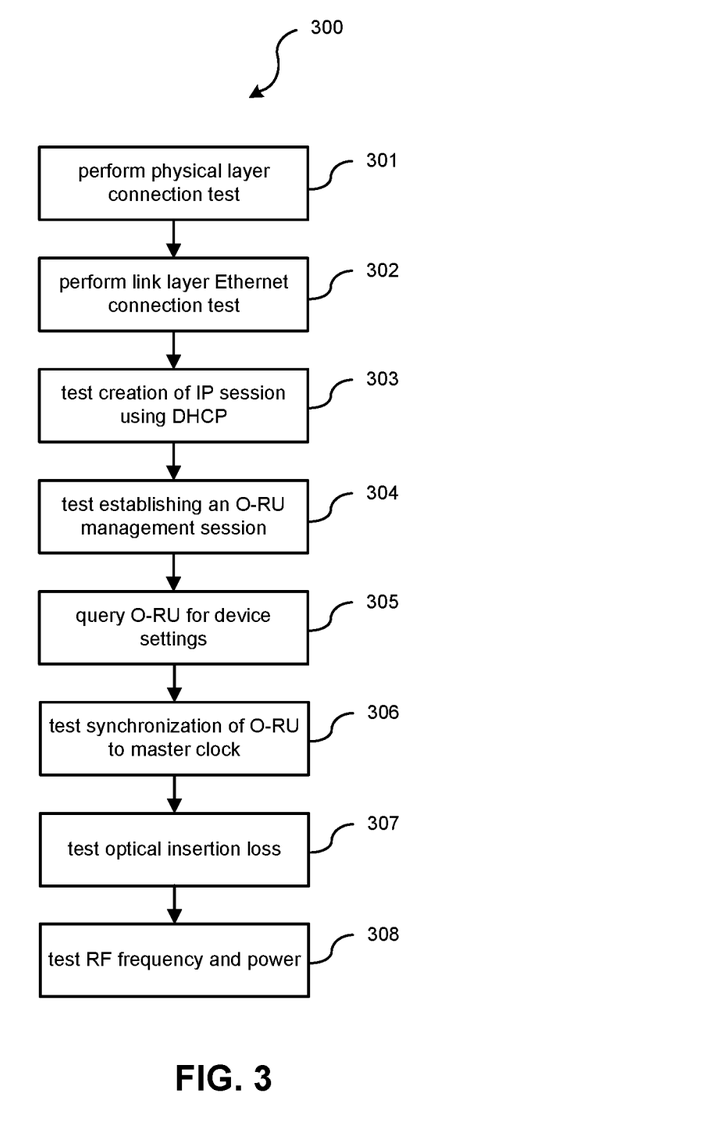
FIG. 3 illustrates a flow chart of a method, according to an example of the present disclosure.

FIG. 3 shows a flowchart of an example workflow that may be stored and executed by the test device 100 to test O-RU 21. The tests described in FIG. 3 are designed to be performed in sequence to test various aspects of the O-RU 21, but one or more of the tests may be performed individually, consecutively or out of sequence as needed. To perform the tests, the test device 100 is placed into O-DU emulation mode so the test device 100 operates as an O-DU to send commands to the O-RU 21 using the proper formats and protocols as is further described below and was mentioned above with respect to the O-RAN specification and the M/S/C/U-Planes. For example, O-RU management functions for setting parameters are done over the M-Plane. The management functions include O-RU software management, fault management, etc., as specified in the O-RAN specification regarding fronthaul. O-RAN fronthaul specifications prescribe various parameters as data models to achieve the required management operation. M-Plane messages are used to manage the radio unit. M-Plane provides a variety of O-RU management functions to set parameters on the O-RU side as required by the C/U-Plane and S-Plane. The test device 100 emulates the O-DU to communicate, via its optical interface, with the O-RU 21 via fronthaul 25 to perform the tests described in FIG. 3 according to protocols and messaging formats described in the O-RAN specification.

At 301, the test device 100 tests physical layer connectivity of the O-RU 21 to fronthaul 25 based on detection of an optical signal received from the O-RU 21 at the optical interface of the test device 100. For example, the test device 100 is connected to the fronthaul 25 as shown in FIG. 2. The test device 100 emulates an O-DU by sending commands to the O-RU 21 via the fronthaul 25 to invoke the radio of the O-RU 21 to transmit a signal to the test device 100. Assuming the O-RU 21 is properly connected to the fronthaul 25 and receives the commands transmitted from the test device 100, the radio of the O-RU 21 transmits optical signals to the test device 100 via the fronthaul 25. For example, an SFP of a radio of the O-RU 21 sends signals via the fronthaul 25 to the test device 100 connected to the fronthaul 25. The test device 100 confirms that an optical signal is received via the fronthaul 25. In an example, the test device 100 may verify an optical power level of received signals, e.g., confirms power is above a threshold, to determine that the O-RU 21 is powered up and its SFP is transmitting signals. The test device 100 can then generate a notification, such as via a display, to indicate that the signal is present. If no signals are received by the test device 100 in response to the commands, the test device 100 may generate notifications, such as via a display to user, to check that the O-RU 21 is powered up and/or to check the connection of O-RU 21 to the fiber, such as by cleaning all connections to the fiber of the fronthaul with the proper optical cleaning gear. Also, the signal power and transmission rate can be displayed on the test device 100 for determining whether the radio is powered up and whether the SFP of the radio supports the required line rates.

At 302, the test device 100 tests Ethernet link layer (layer 2) connectivity of the O-RU 21 to the test device 100 via fronthaul 25. For this test, the test device 100 establishes an Ethernet connection with the O-RU 21 over the fronthaul 25. For example, the test device 100 may receive an Ethernet packet from the O-RU 21 via the fronthaul 25, and determines whether the source MAC address of the packet is the proper MAC address of the O-RU 21 that is predetermined. The MAC address of the received packet can be displayed on the display of the test device 100. The test device 100 may store the proper MAC address of the O-RU 21, and can compare the received source MAC address to the stored proper MAC address of the O-RU 21 to determine whether they match and provide notifications accordingly via the display indicative of whether the received source MAC address matches the stored proper MAC address.

At 303, the test device 100 tests creation of an IP session using Dynamic Host Configuration Protocol (DHCP). For example, the test device 100 tests whether the O-RU 21 can obtain its IP address from DHCP server software, e.g., hosted on the test device 100, using one of the DHCP options specified in O-RAN M-Plane specification section 3.1.1 and 3.1.4. The test device 100 receives a packet from the O-RU 21 via the fronthaul 25 and determines whether the source IP address is the IP address assigned by the DHCP server. Establishing the NETCONF session at 303 and setting of a transport layer address (e.g., IP address) on the O-RU 21 at 304 may be part of a start-up process for the O-RU 21. M-plane messaging is used to start a DHCP server and assign an IP address to the O-RU 21, and to get the IP address of the O-RU 21.

At 304, the test device 100 executes M-plane messaging with the O-RU 21 via fronthaul 25 to test establishing an O-RU management session between the test device 100 and the O-RU 21. The M-plane management session is currently specified as a NETCONF session. The NETCONF session is created through M-plane messaging, and additionally testing can be performed through M-plane messaging. The M-plane protocol stack uses Ethernet Layer 2 (i.e., MAC address), IP, TCP, SSH, and NETCONF to carry the M-plane messages between the O-RU and the O-DU. To emulate the O-DU for M-plane messaging and testing, the test device 100 initializes and establishes a NETCONF session with the O-RU 21. NETCONF is a network management protocol developed and standardized by the Internet Engineering Task Force (IETF) standards body. NETCONF is an XML-based protocol that client applications use to request information from and make configuration changes to the device. Yet Another Next Generation (YANG) is primarily used to model the configuration and state data used by NETCONF operations.

The ORAN specification defines models for O-RU management where the O-DU has a NETCONF client and the O-RU has as NETCONF server. The test device 100 emulates an O-DU to initiate a NETCONF session by sending messages between a NETCONF client hosted on the test device 100 and a NETCONF server hosted on the O-RU 21. The test device 100 receives a username and password for the NETCONF session from O-RU 21 and verifies that the username and password match a predetermined username and password for O-RU 21 and also verifies successful completion of the NETCONF initiation process. If the NETCONF session cannot be established, a notification may be generated on the display of the test device 100.

Also, the testing may include supervision of maintaining the NETCONF session between the test device 100 and the O-RU 21. For example, the NETCONF client hosted by the test device 100 enables a periodic notification to be sent from the NETCONF server hosted by the O-RU 21 to the NETCONF client. The test device 100 determines if a notification has not been received within a predetermined time period, and if so, generates a notification that the NETCONF session has failed. In addition, through M-plane messaging with the O-RU 21, the test device 100 can set callback notifications from the O-RU 21 for synchronization state changes, PTP state changes, performance measurement changes, etc.

At 305, the test device 100, using M-plane messaging, queries the O-RU 21 for device settings including the serial number for the O-RU 21 and YANG models, also referred to as YANG modules. M-plane messaging can include using the NETCONF protocol to send commands, such as get, get config, edit config, etc., to the O-RU 21 to set, retrieve or edit desired configuration information/device settings. Remote procedure calls can also be executed over the NETCONF session. The O-RAN YANG models can be retrieved from the O-RU 21 and compared to predetermined information to ensure that the proper O-RU (e.g., proper serial number) is installed. YANG is a data modeling language maintained by the NETMOD working group in the IETF and initially was published as RFC 6020 in October 2010, with an update in August 2016 (RFC 7950). YANG can be used to model both configuration data as well as state data of network elements. Furthermore, YANG can be used to define the format of event notifications emitted by network elements and it allows data modelers to define the signature of remote procedure calls that can be invoked on network elements via the NETCONF protocol. The setting of required parameters for the O-RU 21 is specified in the form of YANG models. The test device 100 can request the O-RU 21 for the YANG models that are supported by the O-RU 21, such as via a NETCONF session, and can also request the O-RU 21 for the serial number for the O-RU 21 and other equipment status information. The test device 100 receives the requested information and can display it and furthermore can compare the information to predetermined information to see if it matches and provide notifications of mismatches via the display. The test device 100 can also request a software inventory of the O-RU 21 via the NETCONF session with M-Plane emulation. In an example, through M-plane messaging the test device 100 can obtain from the O-RU 21 the optical power of the SFP of the O-RU 21 for transmitting and receiving, the O-RU profile including radio model, serial number, software installed on the O-RU 21, MAC and IP addresses of the O-RU 21 and operating bands. In addition, through M-plane messaging the test device 100 can obtain, from the O-RU 21, PTP and Synchronous Ethernet (SyncE) verification. The obtained information can be compared to predetermined information to identify any differences and notifications may be displayed identifying any differences.

At 306, the test device 100 executes S-plane messaging with the O-RU 21 via fronthaul 25 to test synchronization of the O-RU 21 to a master clock. Due to tight timing tolerances in the O-RAN, the O-RU and the O-DU emulator require synchronization to a common clock.

In the S-plane, signals are transmitted over the fronthaul 25 using PTP or SynchE for clock synchronization in the O-RAN. Test device 100 emulates a PTP/SyncE grandmaster clock, and checks whether the O-RU 21 can synchronize with the master clock based on messages exchanged between the test device 100 and the O-RU 21. PTP is a network-based time synchronization protocol used to synchronize clocks throughout a telecommunications network. Instead of millisecond-level synchronization, PTP networks aim to achieve nanosecond or even picosecond-level synchronization. The IEEE 1588 standard describes clock synchronization for a network using PTP. The IEEE 1588 standard describes specifies roles, such as a master and slaves, and message exchanges to achieve synchronization with the master clock. The test device 100 can send S-plane messages, including PTP messages, to the O-RU 21 via fronthaul 25 to instruct it to synchronize to the grandmaster clock that the test device 100 is providing. The test device 100 determines whether the O-RU 21 can synchronize with a grandmaster clock based on the message exchange, and displays on the test device 100 the status of whether the synchronization is achieved by the O-RU 21. M-plane messages may be exchanged to determine whether the O-RU 21 is synchronizing to the grandmaster clock. For example, the test device 100 tests whether the O-RU 21 can lock onto a 1 pulse per second (PPS) and Time of the Day (ToD) reference signals generated by the test device 100, and displays whether the O-RU 21 is able to synchronize its clock with the 1PPS and ToD reference signals generated by the test device 100. The test device 100 can also display the clock class and the clock accuracy. The IEEE 1588 standard specifies multiple clock classes, and the test device 100 can display the clock class. The IEEE 1588 standard describes a hierarchical master-slave architecture for clock distribution. Under this architecture, a time distribution system consists of one or more communication media (network segments), and one or more clocks. The test device 100 can be provisioned as a PTP Master compliant with ITU-T G.8275.1. The synchronizing to the PTP/SyncE grandmaster clock of the test device 100 is achieved through S-plane synchronization messages exchanged between the test device 100 and the O-RU 21 as The test device 100 can retrieve state parameters from the O-RU 21 utilizing M-plane messaging. The state parameters may include Sync State, PTP Lock State, PTP State, PTP Clock-class, Sync-E Lock-state, and Sync-E Quality-level. Based on the parameters retrieved using M-plane messaging, the test device 100 can display whether the O-RU 21 is able to lock onto the grandmaster clock of the test device 100 and other information discussed above. Also, the test device 100 can validate and display uplink and downlink C/U-Plane message timing relative to a PTP Master time reference.

Clock accuracy of the O-RU 21 when compared to the clock reference signal generated by the test device 100 can also be shown, such as in terms of nanoseconds. In an example, if the O-RU 21 is not synchronizing to the clock reference signals generated by the test device 100, the test device 100 can display remedial actions to correct the synchronization, such as to check if the MAC address, IP address and VLAN of the O-RU 21 are correct.

At 307, the test device 100 tests optical insertion loss of signals transmitted to and from the O-RU 21 via the fronthaul 25. To test optical insertion loss, the test device 100 calculates optical insertion loss by comparing the test device 100 transmit and receive power levels with that of the O-RU 21. The latter information is obtained from the O-RU 21 transceiver YANG model through M-plane messaging.

The test device 100 may include an optical power meter to measure power levels of signals transmitted and received on the fronthaul 25. The test device 1001 for example performs a link or channel insertion loss measurement using an optical light source (OLS) and an optical power meter (also known as "OLP" or "MP") to verify receipt of a correct power range with proper optical headroom. When tests are performed on fiber optic networks, the results are displayed on a meter readout in units of "dB." To measure loss, measurements are made before the connection and after the connection, then the two results are compared to get a relative measurement of loss in dB.

At 308, the test device 100 tests whether the O-RU 21 can transmit signals in predetermined radio frequency (RF) frequency and RF power. For example, the test device 100 emulates an O-DU by transmitting PTP packets whose timestamps are derived from the 1PPS and Time of the Day (ToD) signal created by the test device 100 to the O-RU 21 via fronthaul 25. The test device 100 transmits a C/U plane test vector to the O-RU 21, and the test device 100 tests the RF power and frequency with a spectrum analyzer. For the RF frequency and power test, the O-DU emulator of the test device 100 includes a C/U plane engine that can generate eCPRI packets for the downlink. The eCPRI packets are generated by the test vector. eCPRI packets are transported to the O-RU 21 via fronthaul 25.

Uplink U-plane eCPRI packets are transported to the test device 100 via the fronthaul 25. Frequency domain uplink signals can be analyzed using software. The testing verifies eCPRI control signals and extracts user plane traffic (i.e., I/Q data) transmitted between the O-RU 21 and the test device 100. Thus, the test device facilitates monitoring and analysis of interference signals on mobile devices in the uplink and downlink directions.

Figure 4:
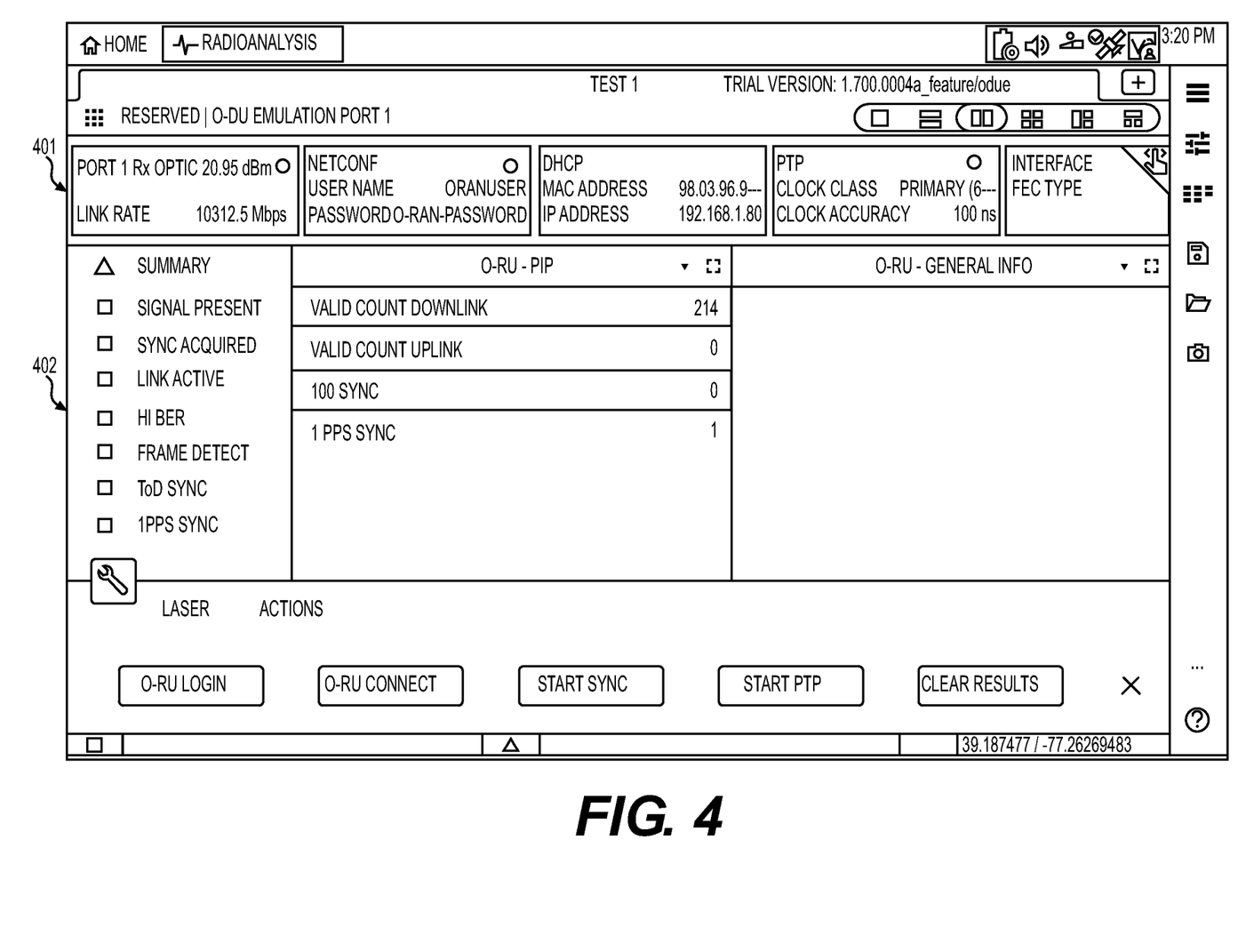
FIG. 4 illustrates a graphical user interface of the test device, according to an example of the present disclosure.

FIG. 4 shows a GUI that may be generated on a display of the test device 100 to show results of one or more of the tests described above with respect to FIG. 3. In an example, the GUI may display availability of optical power, synchronization established, link layer operating, NETCONF session running, and radio inventory.

Section 401 of the GUI shows the port of the test device 100 that is connected to fronthaul 25 and the bandwidth, e.g., link rate. A NETCONF user name and password acquired from the O-RU 21 are shown. A MAC address and IP address of the O-RU 21 are shown, and which was acquired when establishing a link layer Ethernet connection and creating an IP session with the O-RU 21. Also, PTP information, such as clock class and clock accuracy are shown. Interface type may also be displayed.

Section 402 of GUI may also include colored LEDs to summarize test results, such as green indicating a pass and red indicating a failure. The test results may indicate availability of optical power, sync established, link layer operating, NETCONF session running, and radio inventory. For example, signal present and 1PPS synch LEDs are shown as green to indicate that these tests have passed but ToD failed and may be shown as a red LED. Also shown is PTP synchronization information when PTP synch testing is performed, such as information for valid counts in the uplink/downlink, ToD synchronization and 1PPS synchronization. General information may also be shown including serial number, inventory, etc. Also, not shown, the GUI may include a window for displaying a workflow for testing, and remedial actions to be performed to correct errors based on failed test results.

The test device 100 display can verify the O-RU 21 is connected to fronthaul 25 and is running. Also, the test device 100 can check the SFP of the O-RU 21 and optical loss in both directions (uplink and downlink). Also, the test device 100 can enable the O-RU 21 to transmit signals over the air (OTA) and verify the signals with OTA tests. The test device 100 can put the radio unit of the O-RU 21 in minimal RF transmit mode on specified frequencies to check Voltage Standing Wave Ratio (VSWR) and Passive Intermodulation (PIM).

Figure 5:
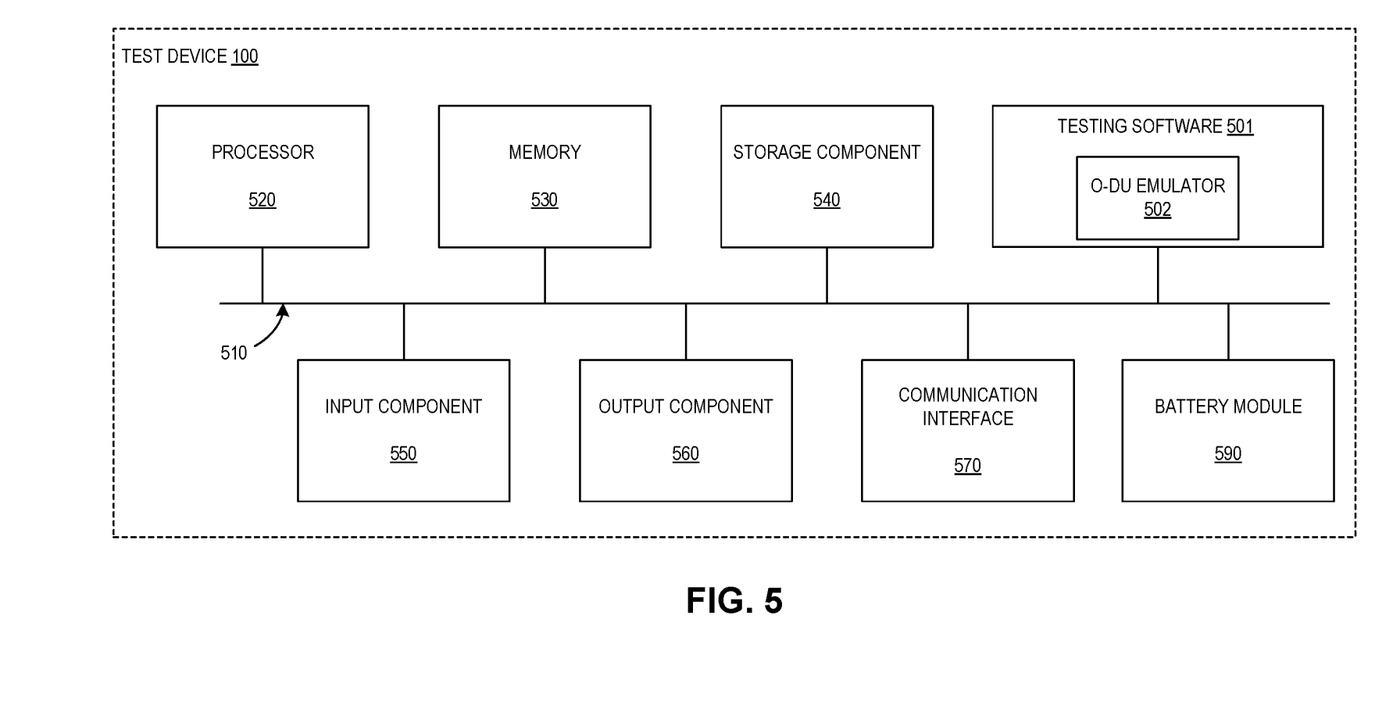
FIG. 5 illustrates a block diagram of the test device, according to an example of the present disclosure.

FIG. 5 is a diagram of components of test device 100, according to an example of the present disclosure. Test device 100 may include a bus 510, a processor 520, a memory 530, a storage component 540, an input component 550, an output component 560, a communication interface 570, battery module 590, and testing software 501 with O-DU emulator 502. In an example, the testing software 501 may include machine-readable instructions stored on a non-transitory storage medium, e.g., memory 530, and executed by a processor, such as processor 520.

The testing software 501 comprises machine-readable instructions executable by the processor 520 to perform the tests described above. The testing software 501 can check whether the radio unit of the O-RU 21 is powered up and transmitting over the air in correct frequency and power. The test device 100 also checks connectivity of the O-RU 21 to the fronthaul 25 including checking the SFP of the O-RU 21 and messaging via fronthaul 25. The ODU emulator 502 establishes a connection to the O-RU 21, retrieves inventory data from the O-RU 21, retrieves SFP transmit/receive values from the O-RU 21, and enables RF power transmission on the downlink.

The testing software 501 includes M-Plane management that can generate and transmit M-Plane messages to the O-RU 21 including messages for DHCP IP address assignment and NETCONF session setup. For example, the testing software may include a DHCP server to assign an IP address to the O-RU 21 and a NETCONF client for the NETCONF session setup. The testing software includes S-Plane management that can generate and transmit PTP and SyncE messages for clock synchronization testing. The testing software 501 can build C-Plane and downlink U-Plane descriptors and store I/Q data samples for C/U-Plane testing. In an example, C-Plane and downlink U-Plane descriptors and I/Q data samples are stored in memory, and then read to implement the testing. The testing device 100 updates Frame ID, dynamic header fields, etc., and transmits to the O-RU 21 according to delay management settings.

Bus 510 includes a component that permits communication among the components of test device 100. Processor 520 is implemented in hardware, firmware, or a combination of hardware and software. Processor 520 may include one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, processor 520 includes one or more processors capable of being programmed to perform a function. Memory 530 may include one or more memories such as a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of test device 100. For example, storage component 540 may include a hard disk (e.g., a magnetic disk, solid state disk, etc.) and/or another type of non-transitory computer-readable medium.

Input component 550 includes a component that permits test device 100 to receive information, such as via user input (e.g., a touch screen display, a keyboard, a keypad, a mouse, a button, a switch, and/or a microphone). Additionally, or alternatively, input component 550 may include a sensor for sensing information (e.g., a GPS component, an accelerometer, a gyroscope, and/or an actuator). Output component 560 includes a component that provides output information from test device 205 (e.g., a display, a speaker, a user interface, and/or one or more light-emitting diodes (LEDs)). Output component 560 may include a display providing a GUI, such as GUI 400. Input component 550 and output component 560 may be combined into a single component, such as a touch responsive display, also known as a touchscreen.

Communication interface 550 includes a transceiver-like component (e.g., a transceiver and/or a separate receiver and transmitter) that enables test device 100 to communicate with other devices, such as via a wired connection, a wireless connection, or a combination of wired and wireless connections. Communication interface 550 may permit test device 205 to receive information from another device and/or provide information to another device. For example, communication interface 570 may include an Ethernet interface, an optical interface, a coaxial interface, an infrared interface, an RF interface, a universal serial bus (USB) interface, a Wi-Fi interface, a cellular network interface, or the like. The test device 100 also includes ports, e.g., optical ports, for connecting to the fronthaul 25 to test DUTs, such as O-RU 21. The ports may include SFPs connectable to fibers.

Battery module 590 is connected along bus 510 to supply power to processor 520, memory 530, and internal components of test device 100. Battery module 590 may supply power during field measurements by test device 205. Battery module 590 permits test device 205 to be a portable integrated device for conducting field measurements of propagation delay in a RAN.

Test device 100 may perform one or more processes described herein. Test device 100 may perform these processes by processor 520 executing software instructions, e.g., testing software 501, stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 550. When executed, software instructions stored in memory 530 and/or storage component 540 may instruct processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The test device 100 may include components other than shown. For example, the test device 100 may include a spectrum analyzer and power meter for performing tests described above with respect to FIG. 3. The number and arrangement of components shown in FIG. 5 are provided as an example. In practice, test device 100 may include additional components, fewer components, different components, or differently arranged components than those shown in FIG. 5. Additionally, or alternatively, a set of components (e.g., one or more components) of test device 100 may perform one or more functions described as being performed by another set of components of test device 100.

What is claimed is:

1. A test device for testing conditions associated with a fronthaul in an Open Radio Access Network (O-RAN), the test device comprising:
 a processor;
 a memory to store machine-readable instructions executable by the processor to perform cell site testing;
 an input/output (I/O) device comprising a display;
 an optical interface connectable to a fiber optic cable in the fronthaul, wherein an O-RAN radio unit (O-RU) installed at a cell site is connectable to an O-RAN distributed unit (O-DU) in the O-RAN via the fronthaul; and
 the processor is to execute the machine-readable instructions to:
  emulate the O-DU to communicate, via the optical interface, with the O-RU via the fronthaul;
  test physical layer connectivity of the O-RU to the fronthaul based on detection of an optical signal received from the O-RU at the optical interface of the test device via the fronthaul;
  test Ethernet link layer connectivity of the O-RU to the test device via the fronthaul;
  execute management plane (M-plane) messaging with the O-RU via the fronthaul to test establishing an O-RU management session between the test device and the O-RU and to obtain device settings of the O-RU; and
  execute synchronization plane (S-plane) messaging with the O-RU via the fronthaul to test synchronization of the O-RU to a master clock.

2. The test device of claim 1, wherein the processor is to execute the machine-readable instructions to test whether the O-RU utilizes an Internet Protocol address assigned by a Dynamic Host Configuration Protocol server hosted by the test device.

3. The test device of claim 1, wherein after establishing the O-RU management session, the test device tests that the O-RU management session is maintained by the O-RU by instructing the O-RU to provide a periodic notification to the test device that the O-RU management session is being maintained.

4. The test device of claim 1, wherein the O-RU management session comprises a Network Configuration Protocol session.

5. The test device of claim 1, wherein to test the physical layer connectivity of the O-RU to the fronthaul, the test device determines whether an optical power of the optical signal received from the O-RU is greater than a threshold.

6. The test device of claim 1, wherein to test the Ethernet link layer connectivity of the O-RU, the test device determines whether an Enhanced Common Public Radio Interface packet received from the O-RU contains a predetermined Media Access Control address of the O-RU.

7. The test device of claim 1, wherein the device settings comprise an O-RU profile, and the test device compares the O-RU profile to predetermined device settings to identify differences.

8. The test device of claim 1, wherein to test synchronization of the O-RU to the master clock, the test device sends precision time protocol messages to the O-RU via the fronthaul instructing the O-RU to synchronize to the master clock.

9. The test device of claim 1, wherein to test synchronization of the O-RU to the master clock, the test device obtains a synchronization state of the O-RU to the master clock through the M-Plane messaging.

10. The test device of claim 1, wherein the test device tests optical insertion loss of optical signals transmitted to and from the O-RU to the test device via the fronthaul.

11. The test device of claim 10, wherein to test the optical insertion loss, the processor executes the machine-readable instructions to compare transmit and receive optical power levels of the test device with transmit and receive optical power levels of the O-RU.

12. The test device of claim 11, wherein the transmit and receive optical power levels of the O-RU are obtained in a Yet Another Next Generation model received through the M-Plane messaging.

13. The test device of claim 1, where the test device utilizes control plane (C-plane) and user plane (U-plane) messaging to transmit a U-plane test vector containing quadrature data samples to the O-RU to test frequency and power of signals transmitted from the O-RU.

14. A portable test device for Open Radio Access Network (O-RAN) field testing, the test device comprising:
 a processor;
 a battery;
 a memory to store machine-readable instructions executable by the processor to perform cell site testing;
 an input/output (I/O) device comprising a display;
 an optical interface connectable to a fiber optic cable in a fronthaul, wherein an O-RAN radio unit (O-RU) installed at a cell site is connectable to an O-RAN distributed unit (O-DU) in the O-RAN via the fronthaul; and
 the processor is to execute the machine-readable instructions to:
  test physical layer connectivity and link layer connectivity of the O-RU to the fronthaul;
  execute management plane (M-plane) messaging with the O-RU via the fronthaul to test establishing of a Network Configuration Protocol (NETCONF) session between the test device and the O-RU and to verify device settings of the O-RU obtained through the M-plane messaging;
  execute synchronization plane (S-plane) messaging with the O-RU via the fronthaul to test synchronization of the O-RU to a master clock; and
  generate notifications on the display indicating whether the physical layer connectivity and the link layer connectivity are established, whether the NETCONF session is running, and whether the O-RU is synchronized to the master clock.

15. The test device of claim 14, wherein the processor is to execute the machine-readable instructions to indicate the device settings on the display, the device settings including a radio model of a radio of the O-RU, a serial number, a software inventory of the O-RU, and a network address of the O-RU.

16. The test device of claim 14, wherein the processor is to execute the machine-readable instructions to test whether the O-RU utilizes an Internet Protocol address assigned by a Dynamic Host Configuration Protocol server hosted by the test device.

17. The test device of claim 14, wherein after establishing the NETCONF session, the test device tests that the NETCONF is maintained by the O-RU by instructing the O-RU to provide a periodic notification to the test device that the NETCONF session is running.

18. The test device of claim 14, wherein the test device tests optical insertion loss of optical signals transmitted to and from the O-RU to the test device via the fronthaul.

19. The test device of claim 18, wherein to test the optical insertion loss, the processor executes the machine-readable instructions to compare transmit and receive optical power levels of the test device with transmit and receive optical power levels of the O-RU, wherein the transmit and receive optical power levels of the O-RU are obtained in a Yet Another Next Generation model received through the M-Plane messaging.

20. A method of a test device emulating an Open Radio Access Network (O-RAN) distributed unit (O-DU) to field test an O-RAN radio unit (O-RU), the method comprising:
  testing physical layer connectivity of the O-RU to a fronthaul in an O-RAN based on detection of an optical signal received from the O-RU at an optical interface of the test device via the fronthaul;
  testing Ethernet link layer connectivity of the O-RU to the test device via the fronthaul;
  testing whether the O-RU utilizes an Internet Protocol address assigned by a Dynamic Host Configuration Protocol server hosted by the test device;
  executing management plane (M-plane) messaging with the O-RU via the fronthaul to test establishing a Network Configuration Protocol (NETCONF) session between the test device and the O-RU and to obtain device settings of the O-RU;
  executing S-plane messaging with the O-RU via the fronthaul to test synchronization of the O-RU to a master clock emulated by the test device; and
  testing optical insertion loss of optical signals transmitted to and from the O-RU to the test device via the fronthaul based on transmit and receive optical power levels of the O-RU obtained in a Yet Another Next Generation model received through the M-Plane messaging.

* * * * *